United States Patent
Ueda et al.

[11] Patent Number: 5,803,464
[45] Date of Patent: Sep. 8, 1998

[54] GLAND PACKING

[75] Inventors: Takahisa Ueda; Masaru Fujiwara, both of Sanda, Japan

[73] Assignee: Nippon Pillar Packing Co., Ltd., Osaka, Japan

[21] Appl. No.: 549,783

[22] PCT Filed: May 1, 1995

[86] PCT No.: PCT/JP95/00862

§ 371 Date: Dec. 1, 1995

§ 102(e) Date: Dec. 1, 1995

[87] PCT Pub. No.: WO95/30851

PCT Pub. Date: Nov. 16, 1995

[30] Foreign Application Priority Data

May 9, 1994 [JP] Japan .................................. 6-094930

[51] Int. Cl.$^6$ ................................................. F16J 15/28
[52] U.S. Cl. .................... 277/528; 277/534; 277/538; 277/539
[58] Field of Search ................................. 277/204, 123, 277/188 R, 528, 534, 538, 539

[56] References Cited

U.S. PATENT DOCUMENTS

| | | | |
|---|---|---|---|
| 1,856,051 | 4/1932 | Fryling | 277/204 |
| 2,357,257 | 8/1944 | Goetze | 277/204 |
| 2,442,311 | 5/1948 | Price | 277/204 |
| 3,009,721 | 11/1961 | Newton | 277/188 A |
| 3,132,870 | 5/1964 | Pschera | 277/204 |
| 4,516,785 | 5/1985 | Miller et al. | 277/188 A |
| 4,892,320 | 1/1990 | Tuckmantel | 277/204 |
| 5,411,274 | 5/1995 | Yahagi et al. | 277/204 |
| 5,499,826 | 3/1996 | Pippert et al. | 227/188 A |
| 5,522,603 | 6/1996 | Naitou et al. | 277/204 |
| 5,573,253 | 11/1996 | Naitou et al. | 277/204 |

FOREIGN PATENT DOCUMENTS

| | | |
|---|---|---|
| 5-27738 | 7/1993 | Japan . |
| 7-3088 | 1/1995 | Japan . |
| 7-15311 | 2/1995 | Japan . |

Primary Examiner—Daniel G. DePumpo
Attorney, Agent, or Firm—Jones, Tullar & Cooper, P.C.

[57] ABSTRACT

The present invention relates to a gland packing which is made of a material configured by laminating an expanded graphite tape into a spiral shape by winding. The gland packing can prevent penetration leak-age through minute gaps existing in the laminated parts, from occurring, can be sufficiently deformed so as to exhibit sure sealing properties even at a low tightening force, and has properties which result in a small amount of wear so as to ensure high sealing properties, so that high sealing performance can be maintained for a long term. In the gland packing, circumferentially projected parts are disposed on end faces of a die mold packing part made of an expanded graphite tape laminated into a spiral shape so as to be integrated with the part. Ring-like seal members are brought into tight contact with the end faces of the die mold packing part excluding the circumferentially projected parts in such a manner that the circumferentially projected parts are project in an axial direction beyond the outer faces of the respective ring-like seal members.

6 Claims, 14 Drawing Sheets

Fig.23
| KINDS | | STRESS GENERATED WHEN COMPRESSED |
|---|---|---|
| PACKINGS OF THE INVENTION | G 1 | 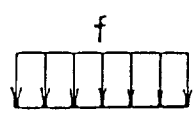 |
| | G 6 | 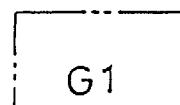 |
| PRIOR ART PACKING | G 0 1 | 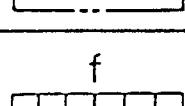 |
| COMPARISON PACKINGS | G 0 2 | 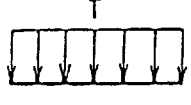 |
| | G 0 3 |  |

Fig. 24

| | USE EXAMPLE 1 (FIG.18) | USE EXAMPLE 2 (FIG.19) | USE EXAMPLE 3 (FIG.20) | USE EXAMPLE 4 (FIG.20) | USE EXAMPLE 5 (FIG.20) | USE EXAMPLE 6 (FIG.26) | USE EXAMPLE 7 (FIG.27) | USE EXAMPLE 8 (FIG.29) |
|---|---|---|---|---|---|---|---|---|
| TIGHTENING FACE PRESSURE 100 | 0.2 | 0.1 | 1.0 | 0.2 | 0.5 | 90 | 100 | 60 |
| TIGHTENING FACE PRESSURE 200 | 0.05 | 0.008 | 0.01 | 0.05 | 0.03 | 1 | 3 | 2 |
| TIGHTENING FACE PRESSURE 300 | 0.0003 | 0.01 | 0.001 | 0.001 | 0.01 | 0.03 | 0.2 | 0.1 |

UNIT: LEAK AMOUNT = cc/min, TIGHTENING FACE PRESSURE = $Kg/cm^2$

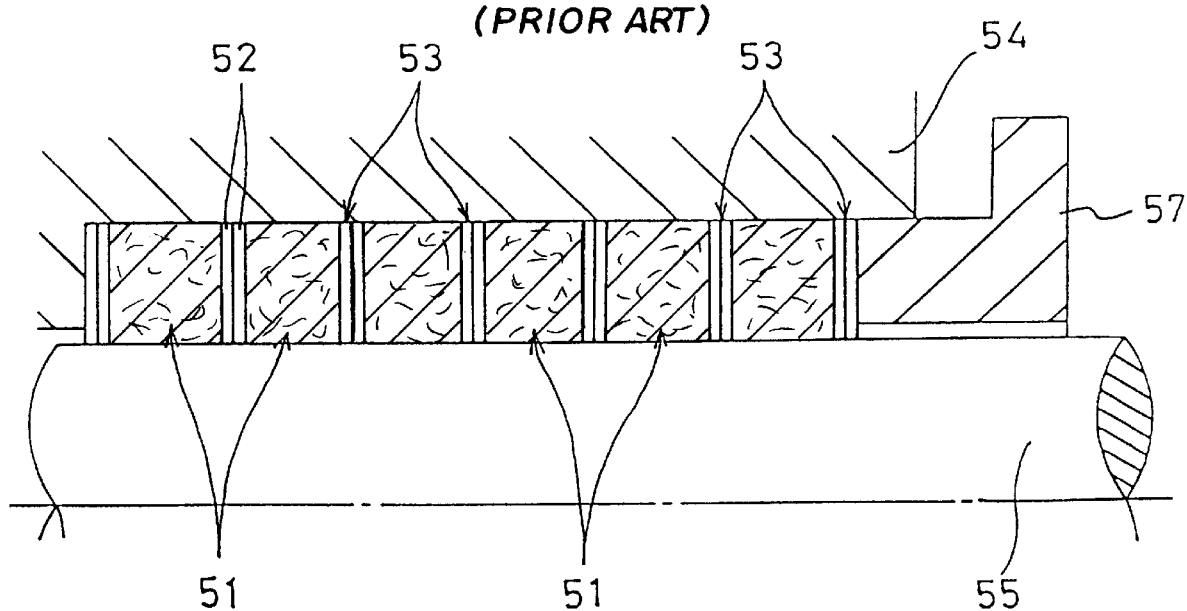
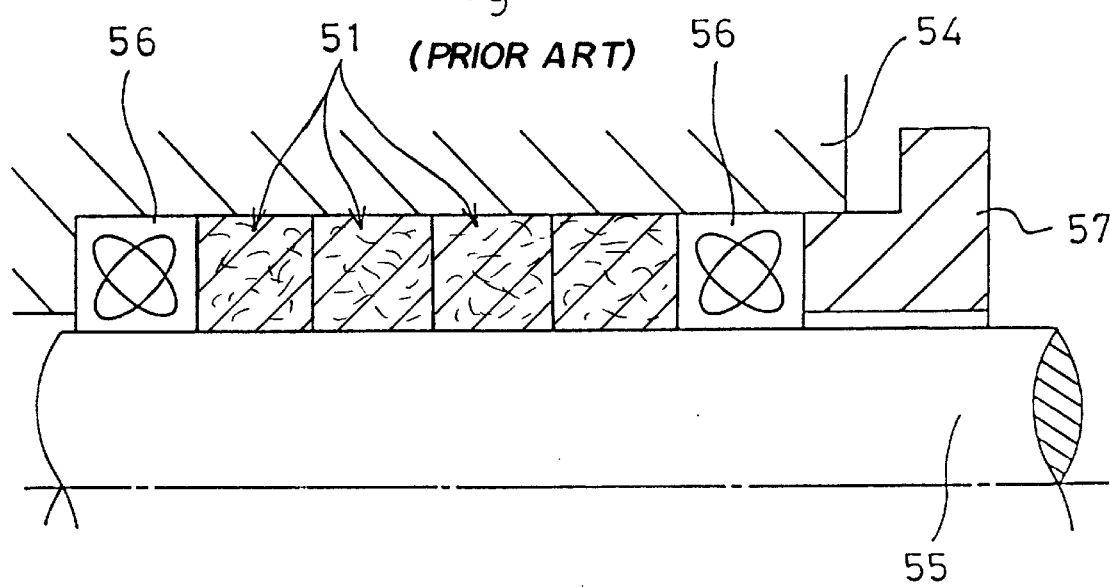

GLAND PACKING

FIELD OF THE INVENTION

The present invention relates to a gland packing which is useful as a shaft seal device for a hydraulic machine such as a valve or a pump, and more particularly to a gland packing which is charged into a stuffing box and pressed by a packing gland in an axial direction so as to be brought into tight contact with the outer peripheral face of a shaft or a valve rod, thereby forming a shaft seal part.

DESCRIPTION OF THE PRIOR ART

A conventionally known gland packing having the structure shown in FIG. 25 is a die mold packing 51. The die mold packing 51 is configured by laminating a tape-like material 50 such as an expanded graphite tape in a winding manner into a spiral shape, and then die-molding the lamination into a ring-like shape. Such a die mold packing 51 is used in the following manner. As shown in FIG. 26, in a stuffing box 54, the die mold packings 51, and a plurality of laminate packings 53 which are obtained by laminating ring-like sheet materials 52 having impermeability are alternately disposed on the outer periphery of a shaft or a valve rod 55 (hereinafter, referred to as "valve rod or the like") in an axial direction. Alternatively, as shown in FIG. 27, the die mold packings 51, and braided packings 56, which are well known in the art, are combined. These packings are pressed in the axial direction by a packing gland 57 so that their inner peripheral facing surfaces are brought into tight contact with the outer peripheral face of the valve rod 55 or the like, thereby performing a shaft sealing operation.

Furthermore, a gland packing 58 is also known in which, as shown in FIG. 28, a circumferentially projected part 51a is formed on an end face in the axial direction of the die mold packing 51 and in an outer end portion in the radial direction so that the circumferentially projected part is projected outward in the axial direction, and a ring-like recess 56a which is formed on an end face in the axial direction of the braided packings 56 and in an outer end portion in a radial direction is fitted onto the circumferentially projected part 51a, thereby integrating the packings 51 and 56 into one body. Also the integrated gland packing 58 is used in the following manner. As shown in FIG. 29, the integrated gland packings 58 are combined in the stuffing box 54 and include the die mold packings 51 having the circumferentially projected part 51a. In the same manner as described above, these packings are pressed in an axial direction by the packing gland 57 so that their inner peripheral facing surfaces are brought into tight contact with the outer peripheral face of the valve rod 55 or the like, thereby performing a shaft sealing operation.

In a prior art gland packing mainly consisting of the die mold packings 51, as shown in FIGS. 25 and 28, minute gaps 59 are inevitably formed in parts that are laminated by winding of the tape-like material 50. A pressurized fluid penetrates into the minute gaps 59, and leakage indicated by the arrow a easily occurs. Particularly when a gas fluid of low molecular weight flows through the hydraulic machine, it is very difficult to prevent penetration leakage from occurring.

Furthermore, the die mold packing 51 has originally a lower strength. In a use manner, the die mold packing is disposed substantially parallel to the axis of the valve rod 55 or the like. When the material is pressed in an axial direction, the material is swollen out to enter the gaps so that stress relaxation easily occurs. Furthermore, the process of die molding is conducted at a high face pressure. When the die mold has a rectangular section shape, therefore, the die mold cannot exhibit sufficient sealing performance at a low tightening force.

Moreover, when the die mold packings 51 and the laminate packings 53 are used in combination as shown in FIG. 26, the amount of deformation of the laminate packings 53 in the pressurizing process is small, and hence the laminate packings 53 must be produced with very high dimensional accuracy. Furthermore, the parts of the laminate packings 53 are easily worn. Even when the parts are worn to a very small amount, the contact surface pressure acting on the valve rod 55 or the like is extremely lowered, thereby producing a problem in that sealing performance is largely impaired.

SUMMARY OF THE INVENTION

The present invention has as an object the provision of a gland packing which can prevent penetration leakage from occurring, which can be sufficiently deformed so as to exhibit sure sealing properties even at a low tightening force, and which has properties which result in a small amount of wear so as to ensure long term high sealing performance.

In order to attain this object, in the gland packing of the present invention, a circumferentially projected part which is projected outward in an axial direction is formed on at least one end face in an axial direction of a die mold packing part and in at least one of outer and inner end portions in a radial direction, the die mold packing part being configured by laminating an expanded graphite tape by winding into a spiral shape and die-molding the lamination into a ring-like shape, a ring-like seal member is brought into tight contact with one end face in the axial direction of the die mold packing part excluding the circumferentially projected part, and the circumferentially projected part is projected in the axial direction beyond an outer face of the ring-like seal member.

Alternatively, the gland packing may be configured in the following manner. The circumferentially projected part is projected outward in the axial direction from both end faces in the axial direction of the die mold packing part and in the outer or inner end portion in a radial direction, or a circumferentially projected part is projected from one end face in the axial direction of the die mold packing part and in the inner end portion in a radial direction, and also from the other end face in the axial direction of the die mold packing part and in the outer end portion in a radial direction so that the circumferentially projected parts are projected outward in the axial direction. Ring-like seal members are respectively brought into tight contact with the end faces in the axial direction of the die mold packing part excluding the circumferentially projected parts.

In the thus configured present invention, a ring-like seal member is brought into tight contact with at least one of the end faces in the axial direction of the die mold packing part. Even when a pressurized fluid penetrates into minute gaps formed in the laminated parts of the expanded graphite tape constituting the die mold packing part, therefore, the leakage of the fluid is blocked by the ring-like seal member and stress relaxation due to swelling out in the axial direction of the die mold packing part is suppressed by the ring-like seal member. The circumferentially projected part which is projected outward in the axial direction is formed in the die mold packing part. When the gland packing is to be used while being charged in a stuffing box, therefore, the projected part is easily deformed by applying only a low tightening force in the axial direction, and hence the density of the projected part is increased and a large stress is generated in a radial direction of the projected part so that the packing is strongly brought into tight contact with the inner face of the stuffing box and the outer peripheral face of a valve rod or the like. This surely prevents penetration leakage from the projected part from occurring, and enhances sealing properties between the stuffing box and the valve rod. Furthermore, the circumferentially projected part has a closely packed folded structure and is very elastic, and hence the circumferentially projected part can satisfactorily follow a small amount of wear, thereby ensuring penetration leak prevention and high sealing properties.

In another gland packing of the present invention, a circumferentially projected part which projects outwardly in an axial direction is formed on at least one end face in the axial direction of a die mold packing part and in at least one of outer and inner end portions in a radial direction, the die mold packing part being configured by laminating an expanded graphite tape into a spiral shape by winding and die-molding the lamination into a ring-like shape, a ring-like seal member is brought into tight contact with the one end face in the axial direction of the die mold packing part excluding the circumferentially projected part, the outer face of the ring-like seal member is formed as an oblique circular cone face which is positioned more outward in the axial direction when moving toward the circumferentially projected part, and the projection end face of the circumferentially projected part is substantially positioned in an extension plane of the oblique circular cone face.

The gland packing may be configured so that circumferentially projected parts are respectively outwardly projected in the axial direction from both end faces in the axial direction of the die mold packing part and in the outer or inner end portion in a radial direction, or ring-like seal members are respectively brought into tight contact with the end faces in the axial direction of the die mold packing part excluding the circumferentially projected parts.

In the thus configured gland packing, even when a pressurized fluid penetrates into minute gaps formed in the laminated parts of the expanded graphite tape constituting the die mold packing part, leakage of fluid is blocked by the ring-like seal member and stress relaxation due to swelling out in the axial direction of the die mold packing part is suppressed by the ring-like seal member. The circumferentially projected part which projects outward in the axial direction is formed in the die mold packing part, and the projection end face of the circumferentially projected part and the outer face of the ring-like seal member are formed as an oblique circular cone face which is positioned more outward in the axial direction when moving toward the circumferentially projected part. When the gland packing is to be used while being charged in a stuffing box, therefore, the projected part and the ring-like seal member are easily deformed by applying only a low tightening force in the axial direction, so that the projected part and the ring-like seal member are positioned in a plane substantially perpendicular to the axis of the valve rod or the like, and hence the density of the projected part is increased and a large stress is generated in a radial direction so that the packing is strongly brought into tight contact with the inner face of the stuffing box and the outer peripheral face of a vale rod or the like. This can surely prevent penetration leakage through the projected part from occurring, and enhance sealing properties between the stuffing box and the valve rod. Furthermore, the circumferentially projected part has a closely packed folded structure and is very elastic, and hence the circumferentially projected part can satisfactorily follow a small amount of wear, thereby ensuring penetration leak prevention and high sealing properties.

In a further gland packing of the present invention, a circumferentially projected part which projects outward in the axial direction is formed on at least one end face in an axial direction of a die mold packing part and in at least one of outer and inner end portions in a radial direction, the die mold packing part being configured by laminating an expanded graphite tape into a spiral shape by winding and die-molding the lamination into a ring-like shape, a ring-like seal member is brought into tight contact with the one end face in the axial direction of the die mold packing part excluding the circumferentially projected part, the outer face of the ring-like seal member is formed as an oblique circular cone face which is positioned more inward in the axial direction when moving toward the circumferentially projected part, and the projection end face of the circumferentially projected part is substantially positioned in an extension plane of the oblique circular cone face.

The gland packing may be configured so that circumferentially projected parts are respectively outwardly projected in the axial direction from both end faces in the axial direction of the die mold packing part and in the outer or inner end portion, or ring-like seal members are respectively brought into tight contact with the end faces in the axial direction of the die mold packing part excluding the circumferentially projected parts.

The gland packing is different from the above-mentioned other gland packings only in that the oblique circular cone face constituted by the projection end face of the circumferentially projected part and the outer face of the ring-like seal member is formed as a circular cone face of an inverse inclination so that the oblique circular cone face is positioned more inward in the axial direction when moving toward the projected part. According to the gland packing, sure prevention of penetration leakage and high sealing properties can be exerted by the synergistic effect of the following configurations: the leakage of a pressurized fluid which penetrates into minute gaps formed in laminated parts of the expanded graphite tape constituting the die mold packing part is prevented from occurring by the ring-like seal member; stress relaxation due to swelling out in the axial direction of the die mold packing part is suppressed by the ring-like seal member; and, when the gland packing is to be used while being charged in a stuffing box, the projected part and the ring-like seal member are easily deformed by applying only a low tightening force in the axial direction, so that the projected part and the ring-like seal member are positioned in a plane substantially perpendicular to the axis of the valve rod or the like, and hence the density of the projected part is increased and a large stress is generated in a radial direction so that the packing is strongly brought into tight contact with the inner face of the stuffing box and the outer peripheral face of the valve rod or the like, whereby penetration leakage through the projected part is surely prevented from occurring and sealing properties between the stuffing box and the valve rod are enhanced.

As the ring-like seal member in the gland packing of each of the above-mentioned configurations, any one of a lamination of a sheet material having impermeability, a single plate, and metal foil may be selectively used.

BRIEF DESCRIPTION OF THE DRAWINGS

FIG. 23 is a table in which stress generating states of the packings of the present invention, a prior art packing, and comparison packings are listed.

FIG. 24 is a table showing results of gas-seal tests of use examples 1 to 5 of the gland packing of the present invention, and use examples of prior art packings.

FIG. 26 is a longitudinal section view showing a use example of the prior art gland packing.

FIG. 27 is a longitudinal section view showing another use examples of the prior art gland packing.

DETAILED DESCRIPTION OF THE PREFERRED EMBODIMENTS

Hereinafter, preferred embodiments of the present invention will be described with reference to the drawings.

First Embodiment

Figure 1:
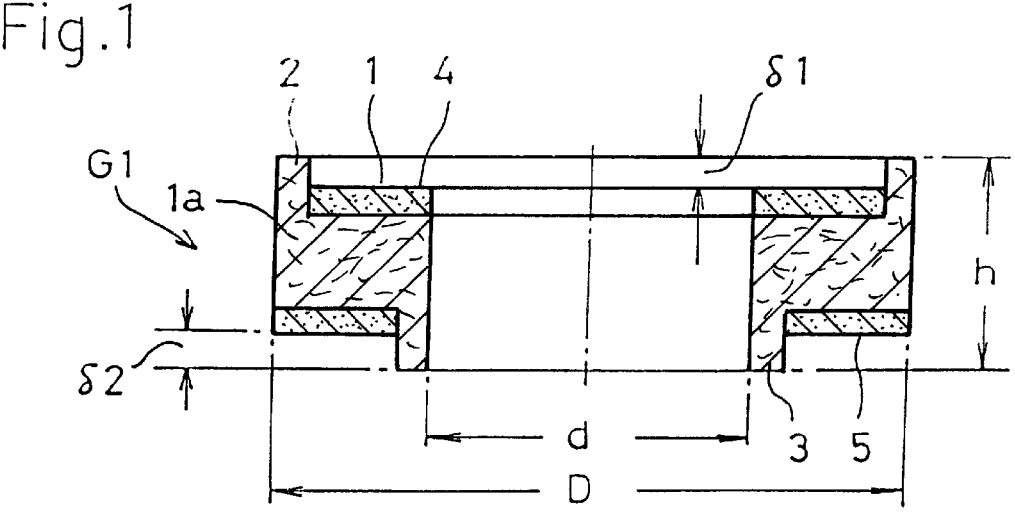
FIG. 1 is a longitudinal section view of a gland packing of a first embodiment of the present invention.

FIG. 1 is a longitudinal section view of a gland packing G1 of a first embodiment of the present invention. In the figure, 1 designates a die mold packing part. The die mold packing part 1 is configured by laminating an expanded graphite tape 1a into a spiral shape by winding, and die-molding the lamination into a ring-like shape having an inner diameter dimension d of 32 mm, an outer diameter dimension D of 48 mm, and a height dimension h of 12 mm. 2 designates a circumferentially projected part which projects outward in an axial direction from one end face in the axial direction of the die mold packing part 1 and in the outer end portion in a radial direction (projection amount $\delta 1=2$ mm) and integrally formed, and 3 designates a circumferentially projected part which is projected outwardly in an axial direction (opposite to the circumferentially projected part 2) from the other end face in the axial direction of the die mold packing part 1 and in the inner end portion in a radial direction (projection amount $\delta 2=2$ mm) and integrally formed. 4 and 5 designate ring-like seal members which are respectively brought into tight contact with the end faces in the axial direction of the die mold packing part 1 excluding the outer and inner circumferentially projected parts 2 and 3. The ring-like seal members 4 and 5 are formed by laminating three punched products of an expanded graphite sheet (thickness of 0.38 mm) having impermeability, and the laminated product is compressed together with the die mold packing part 1. As a result, the section shape shown in FIG. 1 is formed. As the expanded graphite tape 1a constituting the die mold packing part 1, a product obtained by compounding (laminating) knitted meshes of a thin metal wire, or metal foil may be used. The ring-like seal members 4 and 5 may adhere to the die mold packing part 1 so as to be integrated therewith. However, the adhesion of the members is not necessary because the positioning of the members is conducted by the existence of the projected parts 2 and 3.

Second Embodiment

Figure 2:
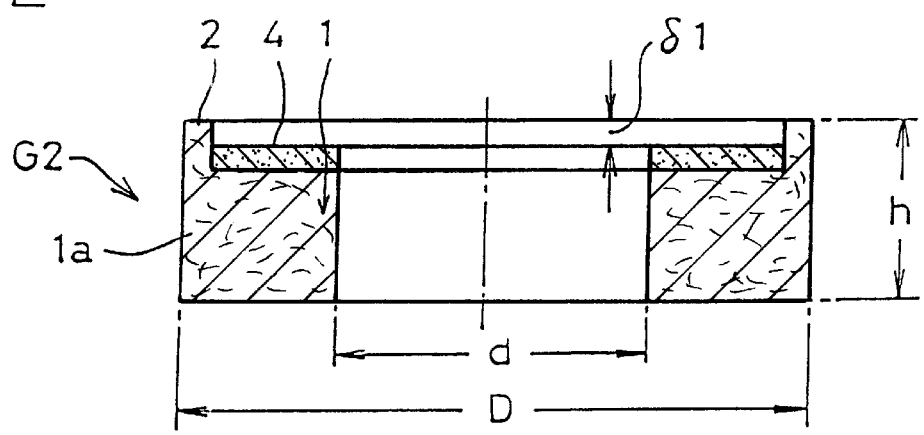
FIG. 2 is a longitudinal section view of a gland packing of a second embodiment of the present invention.

FIG. 2 is a longitudinal section view of a gland packing G2 of a second embodiment of the present invention. In this embodiment, a circumferentially projected part 2 projects outwardly in an axial direction from one end face in the axial direction of a die mold packing part 1 and in the outer end portion in a radial direction, so as to be integrally formed, and a ring-like seal member 4 is brought into tight contact with only one end face in the axial direction of the die mold packing part 1 excluding the circumferentially projected part 2. The method of forming the section shape shown in this figure, the configuration of the die mold packing part 1 and the ring-like seal member 4, the dimensions (d, D, h, $\delta 1$) of the parts, etc. are the same as those of the first embodiment, and hence their detailed description is omitted.

Third Embodiment

Figure 3:
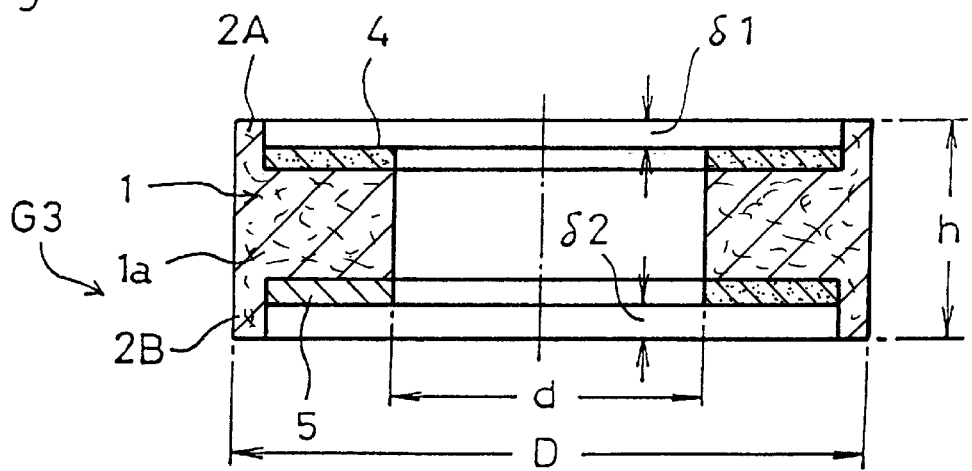
FIG. 3 is a longitudinal section view of a gland packing of a third embodiment of the present invention.

FIG. 3 is a longitudinal section view of a gland packing G3 of a third embodiment of the present invention. In this embodiment, circumferentially projected parts 2A and 2B project outwardly in an axial direction from both end faces in the axial direction of a die mold packing part 1 and in the outer end portion in a radial direction, so as to be integrally formed, and ring-like seal members 4 and 5 are respectively brought into tight contact with both end faces in the axial direction of the die mold packing part 1 excluding the circumferentially projected parts 2A and 2B. The method of forming the section shape shown in this figure, the configuration of the die mold packing part 1 and the ring-like seal members 4 and 5, the dimensions (d, D, h, δ1, δ1) of the parts, etc. are the same as those of the first embodiment, and hence their detailed description is omitted.

Fourth Embodiment

Figure 4:
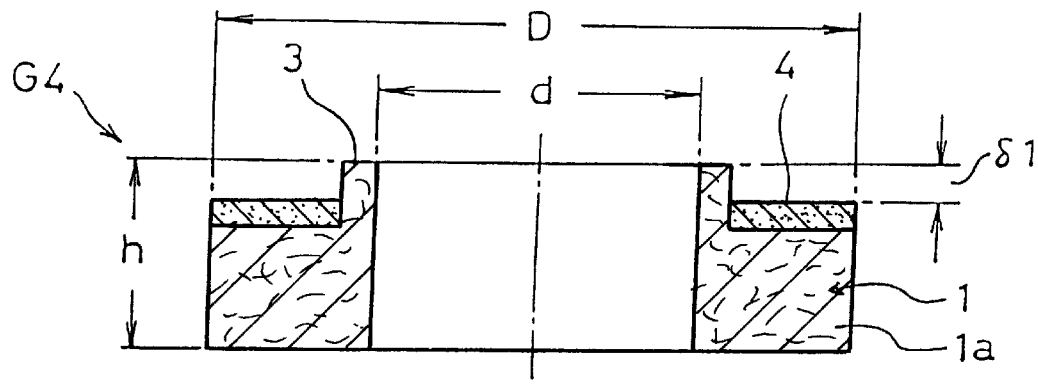
FIG. 4 is a longitudinal section view of a gland packing of a fourth embodiment of the present invention.

FIG. 4 is a longitudinal section view of a gland packing G4 of a fourth embodiment of the present invention. In this embodiment, a circumferentially projected part 3 projects outwardly in an axial direction from one end face in the axial direction of the die mold packing part 1 and in the inner end portion in a radial direction, so as to be integrally formed, and a ring-like seal member 4 is brought into tight contact wit only one end face in the axial direction of the die mold packing part 1 excluding the circumferentially projected part 3. The method of forming the section shape shown in this figure, the configuration of the die mold packing part 1 and the ring-like seal member 4, the dimensions (d, D, h, δ1) of the parts, etc. are the same as those of the first embodiment, and hence their detailed description is omitted.

Fifth Embodiment

Figure 5:
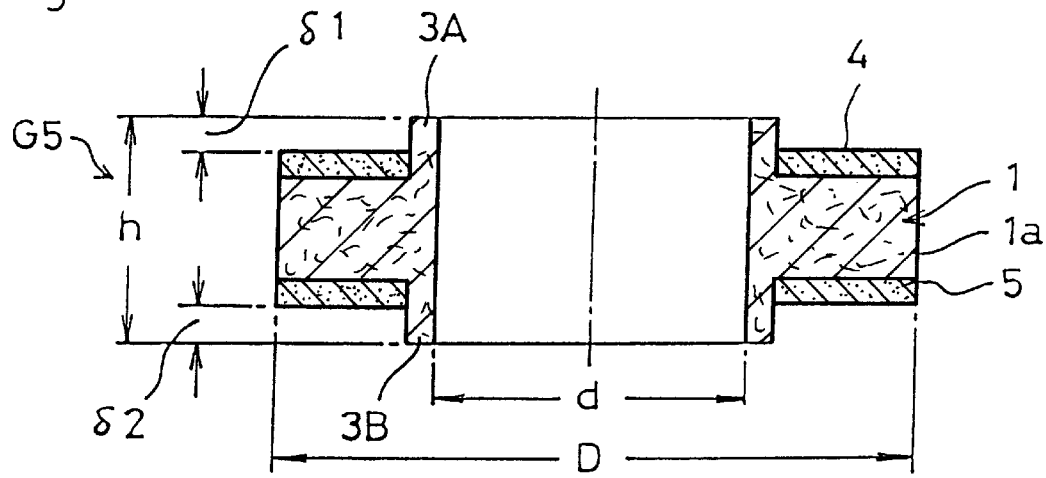
FIG. 5 is a longitudinal section view of a gland packing of a fifth embodiment of the present invention.

FIG. 5 is a longitudinal section view of a gland packing G5 of a fifth embodiment of the present invention. In this embodiment, circumferentially projected parts 3A and 3B project outwardly in an axial direction from both end faces in the axial direction of a die mold packing part 1 and in the inner end portion in a radial direction, so as to be integrally formed, and ring-like seal members 4 and 5 are respectively brought into tight contact with both end faces in the axial direction of the die mold packing part 1 excluding the circumferentially projected parts 3A and 3B. The method of forming the section shape shown in this figure, the configuration of the die mold packing part 1, the dimensions (d, D, h, δ1, δ1) of the parts, etc. are the same as those of the first embodiment except that punched stainless steel plates of a thickness of 0.2 mm are used as the ring-like seal members 4 and 5, and hence their detailed description is omitted.

Sixth Embodiment

Figure 6:
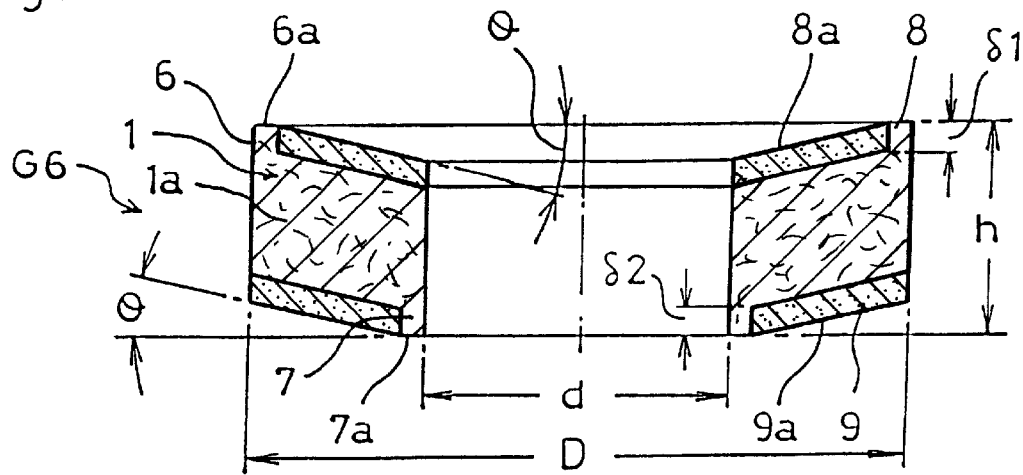
FIG. 6 is a longitudinal section view of a gland packing of a sixth embodiment of the present invention.

FIG. 6 is a longitudinal section view of a gland packing G6 of a sixth embodiment of the present invention. In this figure, 1 designates a die mold packing part. The die mold packing part 1 is configured by laminating an expanded graphite tape 1a into a spiral shape by winding, and die-molding the lamination into a ring-like shape having an inner diameter dimension d of 32 mm, an outer diameter dimension D of 48 mm, and a height dimension h of 10 mm. 6 designates a circumferentially projected part which projects outwardly in an axial direction from one end face in the axial direction of the die mold packing part 1 and in the outer end portion of a radial direction (projection amount δ1=0.2 mm) and integrally formed, and 7 designates a circumferentially projected part which projects outward in an axial direction (opposite to the circumferentially projected part 6) from the other end face in the axial direction of the die mold packing part 1 and in the inner end portion in a radial direction (projection amount δ1=0.2 mm) and integrally formed. 8 and 9 designate ring-like seal members which are respectively brought into tight contact with the end face in the axial direction of the die mold packing part 1 excluding the outer and inner circumferentially projected parts 6 and 7. The ring-like seal members 8 and 9 are configured by punched stainless steel plates of a thickness of 0.2 mm so that outer faces 8a and 9a of the members are respectively formed as oblique circular cone faces which have an inclination Θ of 15° to a plane perpendicular to the axis so as to be positioned more outward in the axial direction when moving toward the circumferentially projected parts 6 and 7, and the projection end faces 6a and 7a of the circumferentially projected parts 6 and 7 are respectively substantially positioned in extension planes of the oblique circular cone faces 8a and 9a.

Seventh Embodiment

Figure 7:
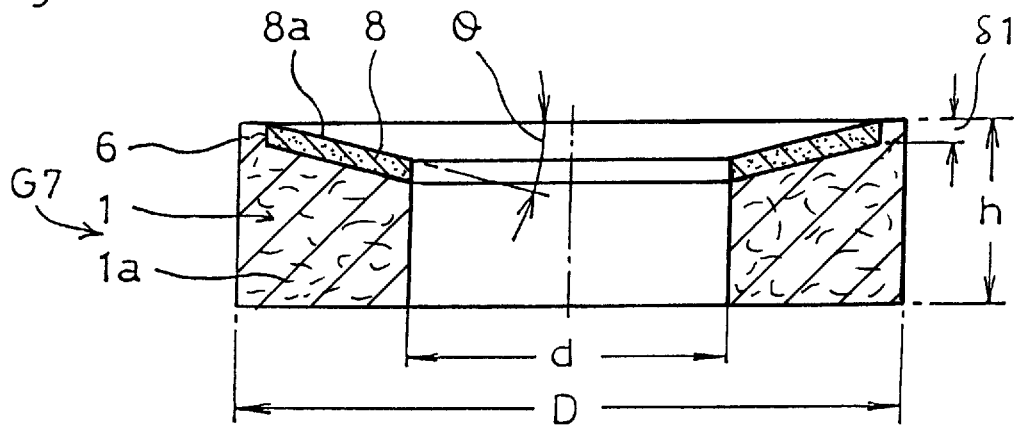
FIG. 7 is a longitudinal section view of a gland packing of a seventh embodiment of the present invention.

FIG. 7 is a longitudinal section view of a gland packing G7 of a seventh embodiment of the present invention. In this embodiment, a circumferentially projected part 6 projects outwardly in an axial direction from one end face in the axial direction of a die mold packing part 1 and in the outer end portion in a radial direction, so as to be integrally formed, and a ring-like seal member 8 is brought into tight contact with only one end face in the axial direction of the die mold packing part 1 excluding the circumferentially projected part 6. The outer face 8a of the ring-like seal member 8 is formed as an oblique circular cone face which is positioned more outward in an axial direction when moving toward the circumferentially projected part 6. The ring-like seal member 8 is formed by laminating three punched products of an expanded graphite sheet (thickness of 0.38 mm) having impermeability, and the laminated product is compressed together with the die mold packing part 1. As a result, the section shape shown in FIG. 7 is formed. The configuration of the die mold packing part 1 other than the above, the dimensions (d, D, h, δ1, Θ) of the parts, etc. are the same as those of the sixth embodiment, and hence their detailed description is omitted.

Eighth Embodiment

Figure 8:
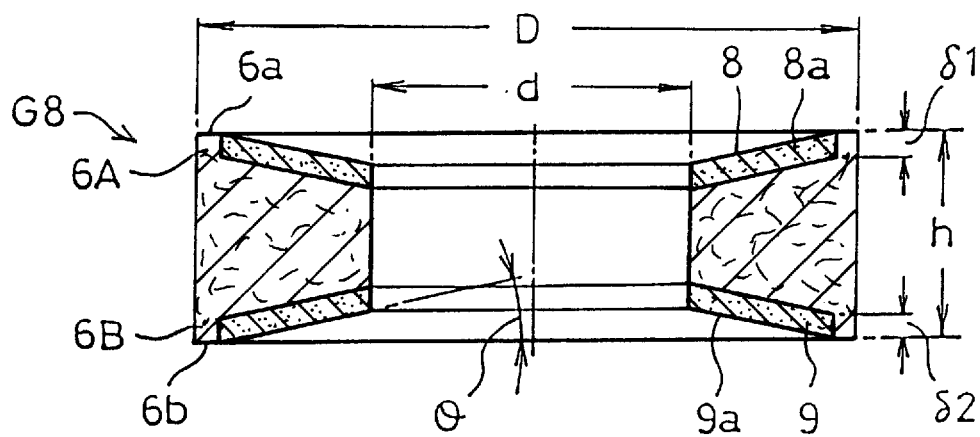
FIG. 8 is a longitudinal section view of a gland packing of an eighth embodiment of the present invention.

FIG. 8 is a longitudinal section view of a gland packing G8 of an eighth embodiment of the present invention. In this embodiment, circumferentially projected parts 6A and 6B project outwardly in an axial direction from both end faces in the axial direction of a die mold packing part 1 and in the outer end portion in a radial direction, so as to be integrally formed, and ring-like seal members 8 and 9 are respectively brought into tight contact with both end faces in the axial direction of the die mold packing part 1 excluding the circumferentially projected parts 6A and 6B. Outer faces 8a and 9a of the ring-like seal members 8 and 9 are respectively formed as oblique circular cone faces which are positioned more outward in an axial direction when moving toward the circumferentially projected parts 6A and 6B. The ring-like seal members 8 and 9 are configured by using a punched polytetrafluoroetylene (PTFE) resin sheet of a thickness of 1.0 mm, and the sheet is compressed together with the die mold packing part 1. As a result, the section shape shown in FIG. 8 is formed. The configuration of the die mold packing part 1 other than the above, the dimensions (d, D, h, δ1, δ2, Θ) of the parts, etc. are the same as those of the sixth embodiment, and hence their detailed description is omitted.

Ninth Embodiment

Figure 9:
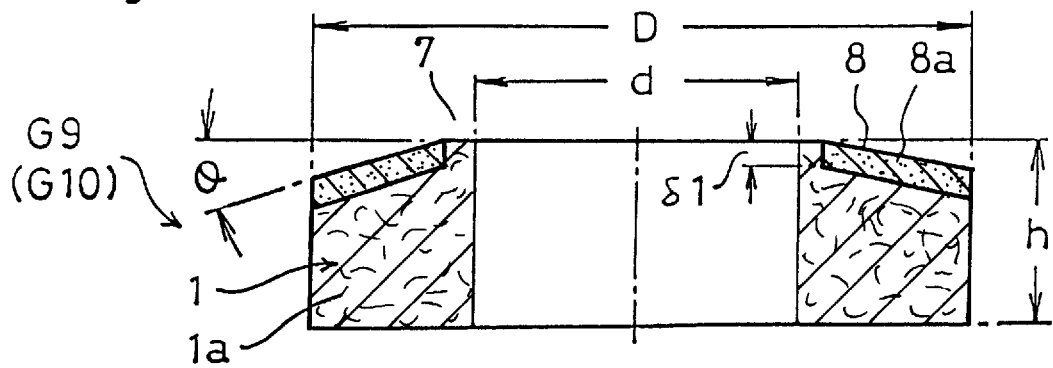
FIG. 9 is a longitudinal section view of a gland packing of a ninth embodiment of the present invention.

FIG. 9 is a longitudinal section view of a gland packing G9 of a ninth embodiment of the present invention. In this embodiment, a circumferentially projected part 7 projects outwardly in an axial direction from one end face in the axial direction of a die mold packing part 1 and in the inner end portion in a radial direction, so as to be integrally formed, and a ring-like seal member 8 is brought into tight contact with only one end face in the axial direction of the die mold packing part 1 excluding the circumferentially projected part 7. The outer face 8a of the ring-like seal member 8 is formed as an oblique circular cone face which is positioned more outward in an axial direction when moving toward the circumferentially projected part 7. The ring-like seal member 8 is formed by laminating three punched products of an expanded graphite sheet (thickness of 0.38 mm) having impermeability, and the laminated product is compressed together with the die mold packing part 1. As a result, the section shape shown in FIG. 9 is formed. The configuration of the die mold packing part 1 other the above, the dimensions (d, D, h, δ1, Θ) of the parts, etc. are the same as those of the sixth embodiment, and hence their detailed description is omitted.

Tenth Embodiment

A gland packing G10 (see FIG. 9) of a tenth embodiment is strictly the same as the ninth embodiment except that PTFE-impregnated glass fiber fabric is used as the ring-like seal member 8, and hence its illustration and detailed description are omitted.

Eleventh Embodiment

Figure 10:
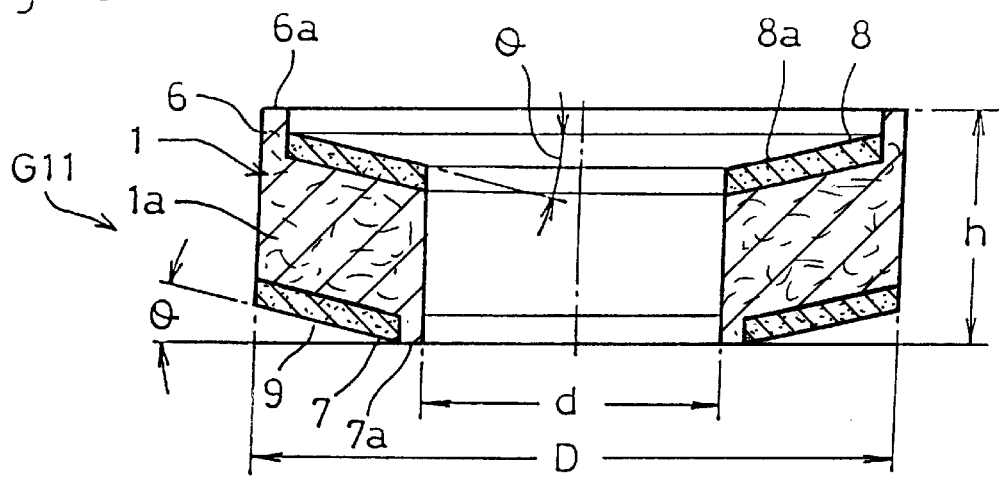
FIG. 10 is a longitudinal section view of a gland packing of an eleventh embodiment of the present invention.

FIG. 10 is a longitudinal section view of a gland packing G11 of an eleventh embodiment of the present invention. In this embodiment, among a circumferentially projected part 6 which is projected outwardly in an axial direction from one end face in the axial direction of a die mold packing part 1 and in the outer end portion in a radial direction and integrally formed, and a circumferentially projected part 7 which is projected outwardly in an axial direction (opposite to the ring-like projected part 6) from the other end face in the axial direction of the die mold packing part 1 and in the inner end portion in a radial direction and integrally formed, the projection end face 6a of the circumferentially projected part 6 which is outside in a radial direction is projected outwardly in the axial direction beyond an oblique circular cone face 8a of one seal member 8 of ring-like seal members 8 and 9 which are brought into tight contact with both end faces in the axial direction of the die mold packing part 1 so as to be formed as oblique circular cone faces which have an inclination Θ of 15° to a plane perpendicular to the axis. The method of forming the section shape shown in this figure, the other configuration, the dimensions of the parts, etc. are the same as those of the sixth embodiment, and hence their detailed description is omitted.

Twelfth Embodiment

Figure 11:
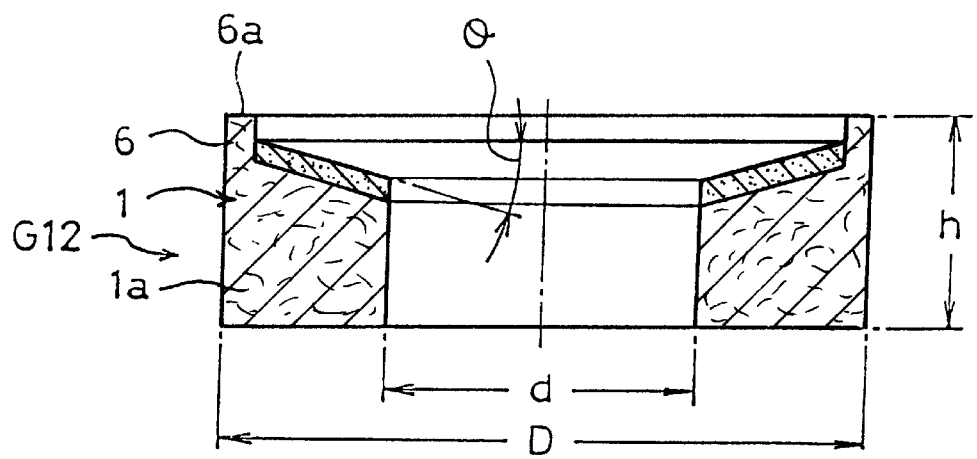
FIG. 11 is a longitudinal section view of a gland packing of a twelfth embodiment of the present invention.

FIG. 11 is a longitudinal section view of a gland packing G12 of a twelfth embodiment of the present invention. In this embodiment, the projection end face 6a of a circumferentially projected part 6 which is projected outwardly in an axial direction from one end face in the axial direction of a die mold packing part 1 and in the outer end portion in a radial direction is projected outwardly in the axial direction beyond an oblique circular cone face 8a of a ring-like seal member 8 which is brought into tight contact on the side of the one end face in the axial direction of the die mold packing part 1 so that the outer face 8a is formed as an oblique circular cone face which is positioned more outward in an axial direction when moving toward the circumferentially projected part 6. The method of forming the section shape shown in this figure, the other configuration, the dimensions of the parts, etc. are the same as those of the seventh embodiment, and hence their detailed description is omitted.

Thirteenth Embodiment.

Figure 12:
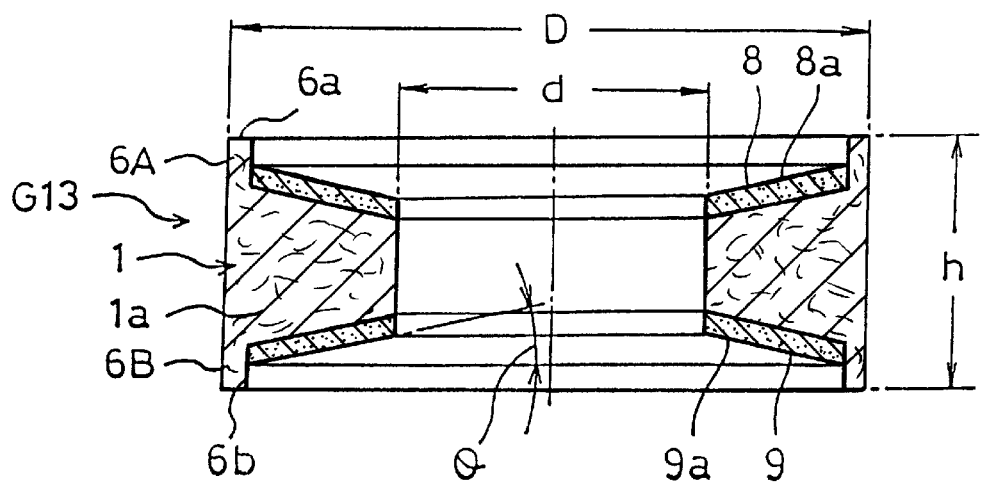
FIG. 12 is a longitudinal section view of a gland packing of a thirteenth embodiment of the present invention.

FIG. 12 is a longitudinal section view of a gland packing G13 of a thirteenth embodiment of the present invention. In this embodiment, the projection end faces 6a and 6b of circumferentially projected parts 6A and 6B which are respectively projected outwardly in an axial direction from both end faces in the axial direction of a die mold packing part 1 and in the outer end portions in a radial direction are projected outwardly in an axial direction beyond oblique circular cone faces 8a and 9a of the ring-like seal members 8 and 9 which are brought into tight contact with both end faces in the axial direction of the die mold packing part 1 so that the outer faces 8a and 9a are formed as oblique circular cone faces which are respectively positioned more outwardly in an axial direction when moving toward the circumferentially projected parts 6A and 6B. The method of forming the section shape shown in this figure, the other configuration, the dimensions of the parts, etc. are the same as those of the eighth embodiment, and hence their detailed description is omitted.

Fourteenth Embodiment

Figure 13:
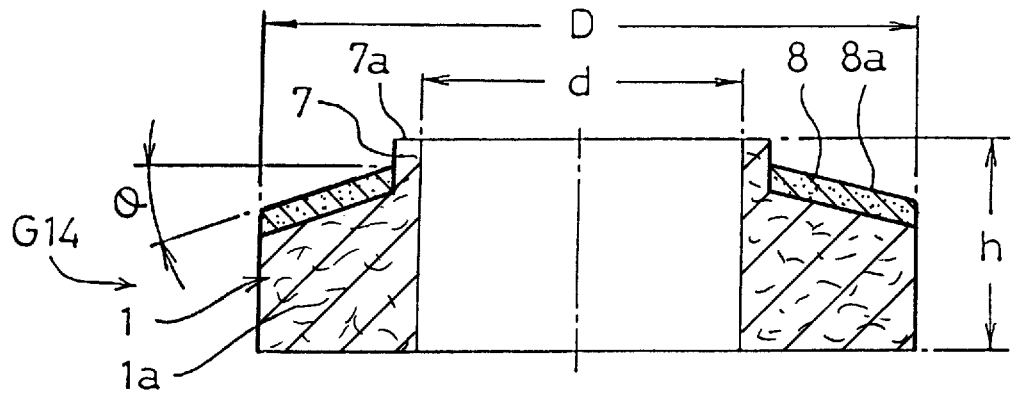
FIG. 13 is a longitudinal section view of a gland packing of a fourteenth embodiment of the present invention.

FIG. 13 is a longitudinal section view of a gland packing G14 of a fourteenth embodiment of the present invention. In this embodiment, the projection end face 7a of the circumferentially projected part 7 which is projected outwardly in an axial direction from one end face in the axial direction of a die mold packing part 1 and in the inner end portion in a radial direction is projected outwardly in the axial direction beyond an oblique circular cone face 8a which is brought into tight contact on the side of the one end face in the axial direction of the die mold packing part 1 so that the outer face 8a is formed as an oblique circular cone face which is positioned more outwardly in an axial direction when moving toward the circumferentially projected part 7. The method of forming the section shape shown in this figure, the other configuration, the dimensions of the parts, etc. are the same as those of the ninth embodiment, and hence their detailed description is omitted.

Fifteenth Embodiment

Figure 14:
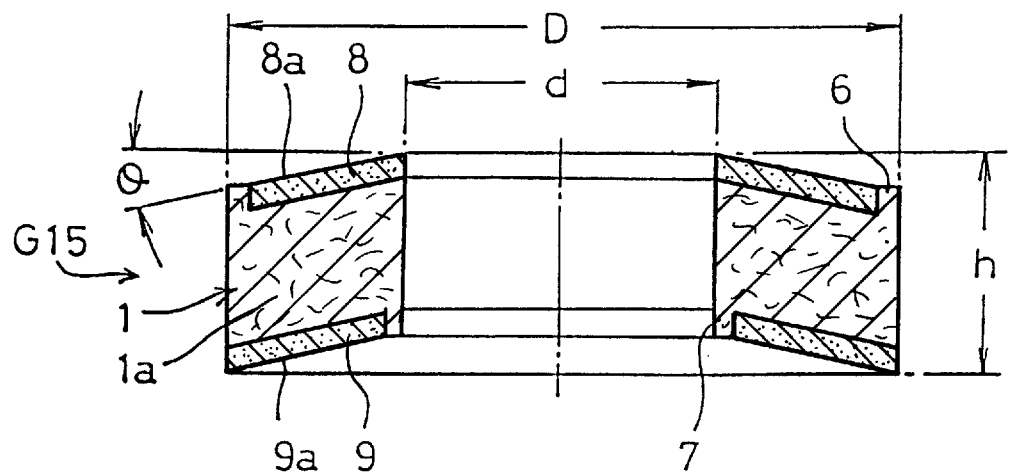
FIG. 14 is a longitudinal section view of a gland packing of a fifteenth embodiment of the present invention.

FIG. 14 is a longitudinal section view of a gland packing G15 of a fifteenth embodiment of the present invention. The embodiment is configured so that the outer faces 8a and 9a of the circumferentially projected parts 8 and 9 which are respectively brought into tight contact with both end faces in the axial direction of a die mold packing part 1 are respectively formed as oblique circular cone faces which have an inclination Θ of 15° to a plane perpendicular to the axis so as to be positioned more inwardly in an axial direction when moving toward the circumferentially projected parts 6 and 7, in the opposite manner as the sixth embodiment, and the projection end faces 6a and 7a of the circumferentially projected parts 6 and 7 are respectively substantially positioned in extension planes of the oblique circular cone faces 8a and 9a. The method of forming the section shape shown in this figure, the other configuration, the dimensions of the parts, etc. are the same as those of the sixth embodiment, and hence their detailed description is omitted.

Sixteenth Embodiment

Figure 15:
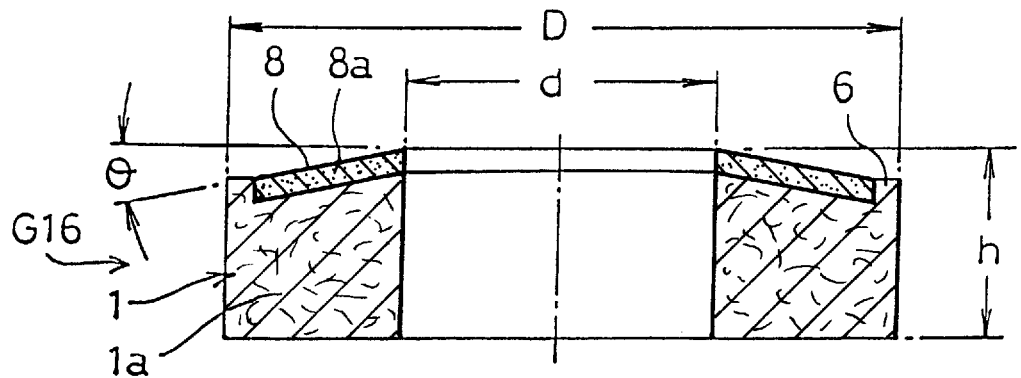
FIG. 15 is a longitudinal section view of a gland packing of a sixteenth embodiment of the present invention.

FIG. 15 is a longitudinal section view of a gland packing G16 of a sixteenth embodiment of the present invention. In this embodiment, a ring-like seal member 8 which is brought into tight contact only on the side of one end face in an axial direction of a die mold packing part 1 is formed so that the outer face 8a is formed as an oblique circular cone face which is positioned more inwardly in an axial direction when moving toward a circumferentially projected part 6 is the opposite manner as the seventh embodiment. The method of forming the section shape shown in this figure, the other configuration, the dimensions of the parts, etc. are the same as those of the seventh embodiment, and hence their detailed description is omitted.

Seventeenth Embodiment

Figure 16:
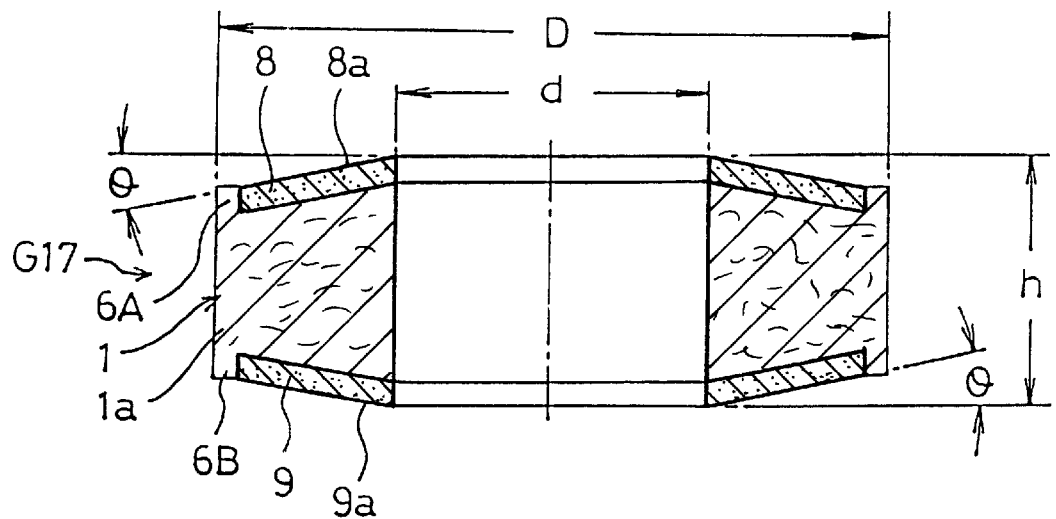
FIG. 16 is a longitudinal section view of a gland packing of a seventeenth embodiment of the present invention.

FIG. 16 is a longitudinal section view of a gland packing G17 of a seventeenth embodiment of the present invention. In this embodiment, ring-like seal members 8 and 9 which are respectively brought into tight contact with both end faces in an axial direction of a die mold packing part 1 are formed so that the outer faces 8a and 9a are formed as oblique circular cone faces which are positioned more inwardly in an axial direction when moving toward the circumferentially projected parts 6A and 6B in the opposite manner as the eighth embodiment. The method of forming the section shape shown in this figure, the other configuration, the dimensions of the parts, etc. are the same as those of the eighth embodiment, and hence their detailed description is omitted.

Eighteenth Embodiment

Figure 17:
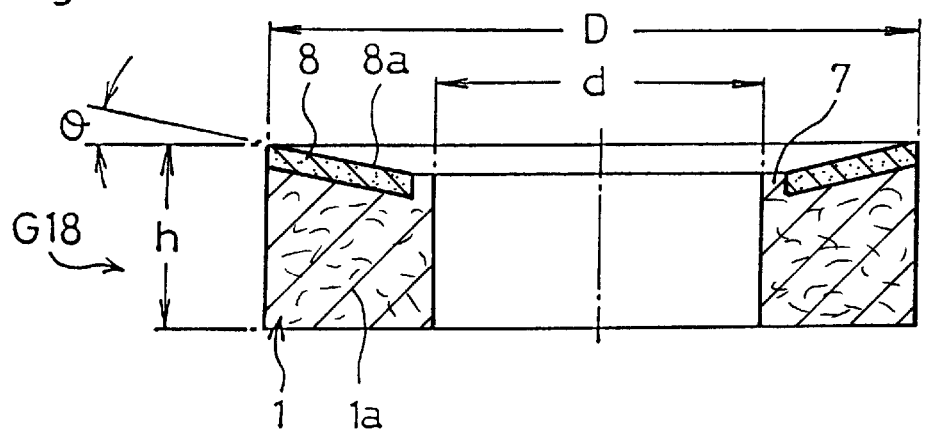
FIG. 17 is a longitudinal section view of a gland packing of an eighteenth embodiment of the present invention.

FIG. 17 is a longitudinal section view of a gland packing G18 of an eighteenth embodiment of the present invention. In this embodiment, a ring-like seal member 8 which is brought into tight contact only on the side of one end face in an axial direction of a die mold packing part 1 is formed so that the outer face 8a is formed as an oblique circular cone face which is positioned more inwardly in an axial direction when moving toward a circumferentially projected part 6 in the opposite manner as the ninth embodiment. The method of forming the section shape shown in this figure, the other configuration, the dimensions of the parts, etc. are the same as those of the ninth embodiment, and hence their detailed description is omitted.

In this gland packings G1 to G18 of the preferred embodiments, as the expanded graphite tape 1a constituting the die mold packing part 1, a product obtained by compounding (laminating) knitted meshes of a thin metal wire, or metal foil may be used. As the ring-like seal members 4, 5, 8, and 9, any sheet having impermeability may be used. In accordance with various use conditions, for example, the material of the members may be adequately selected from an expanded graphite sheet; a stainless steel plate; and a PTFE sheet; and in addition a film of polyphenylene sulfide (PPS), polyether ether ketone (PEEK), aramid, or the like; a sheet of nitrile-butadiene rubber (NBR), chloroprene rubber (CR), synthetic rubber (SR), fluoro rubber, or the like; and a metal foil or a thin plate of copper, aluminum, lead, inconel, or the like.

The ring-like seal members 4, 5, 8, and 9 may adhere to the die mold packing part 1 so as to be integrated therewith. However, the adhesion of the members is not necessary because the positioning of the members is conducted by the existence of the projected parts 2, 3, 6, and 7.

Typical uses of the gland packings of the thus configured embodiments will be described.

Example use 1

Figure 18:
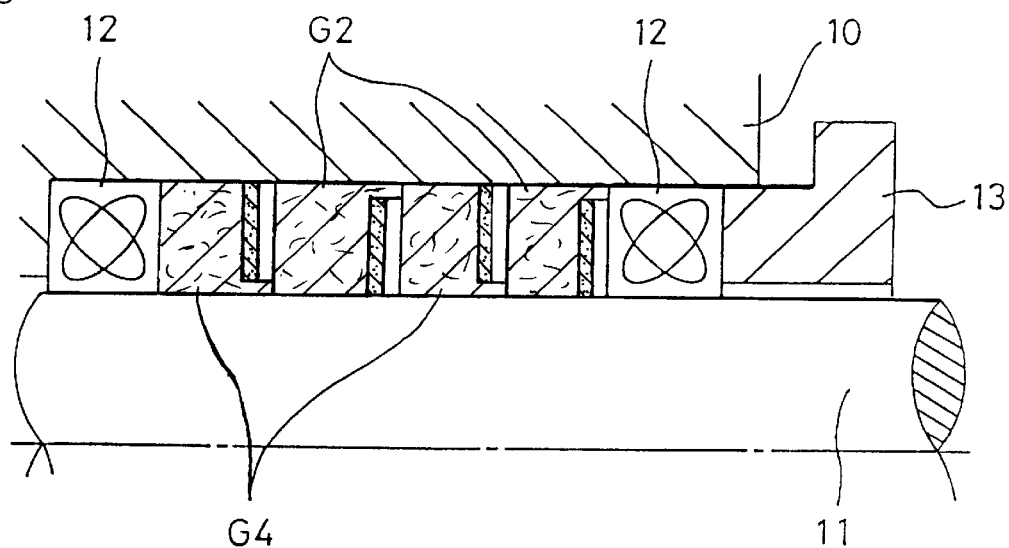
FIG. 18 is a longitudinal section view showing use example 1 of the gland packings of the embodiments of the present invention.
Figure 21:
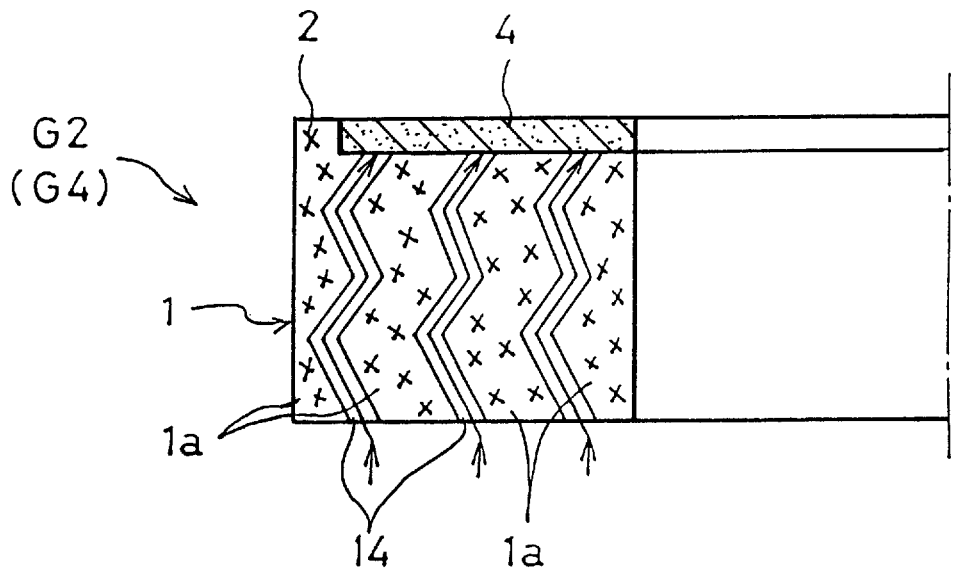
FIG. 21 is an enlarged half longitudinal section view illustrating the penetration leakage prevention action in a use state of the gland packing of the second embodiment of the present invention.

FIG. 18 shows a use in which a plurality of gland packings G2 of the second embodiment and gland packings G4 of the fourth embodiment are alternately arranged in an axial direction on the outer peripheral face of a valve rod 11 or the like in a stuffing box 10, braided packings 12 and respectively disposed at both ends in the axial direction of the arrangement, and a tightening force is applied to one end in the axial direction through a packing gland 13, thereby forming a shaft seal part. In this use, minute gaps 14 such as shown in FIG. 21 are formed in laminated parts of the expanded graphite tape 1a constituting the die mold packing part 1 of each of the gland packings G2 and G4, and a pressurized fluid penetrates into the minute gaps 14. However, leakage of the penetrating fluid to the outside is blocked by the ring-like seal member 4 and also stress relaxation due to swelling out in the axial direction of the die mold packing part 1 is suppressed by the ring-like seal member 4. The circumferentially projected part 2 which is projected outwardly in the axial direction from the die mold packing part 1 is easily deformed by applying a low tightening force in the axial direction, and hence the density of the projected part is increased and a large stress is generated in a radial direction so that the packing is strongly brought into tight contact with the inner face of the stuffing box 10 and the outer peripheral face of the valve rod 11 or the like. This surely prevents also the leakage through the projected part 2 from occurring, and enhances sealing properties between the stuffing box 10 and the valve rod 11 or the like. Furthermore, the circumferentially projected part 2 has a closely packed folded structure and is very elastic, and hence can satisfactorily follow a small amount of wear, thereby ensuring penetration leak prevention and high sealing properties.

Example use 2

Figure 19:
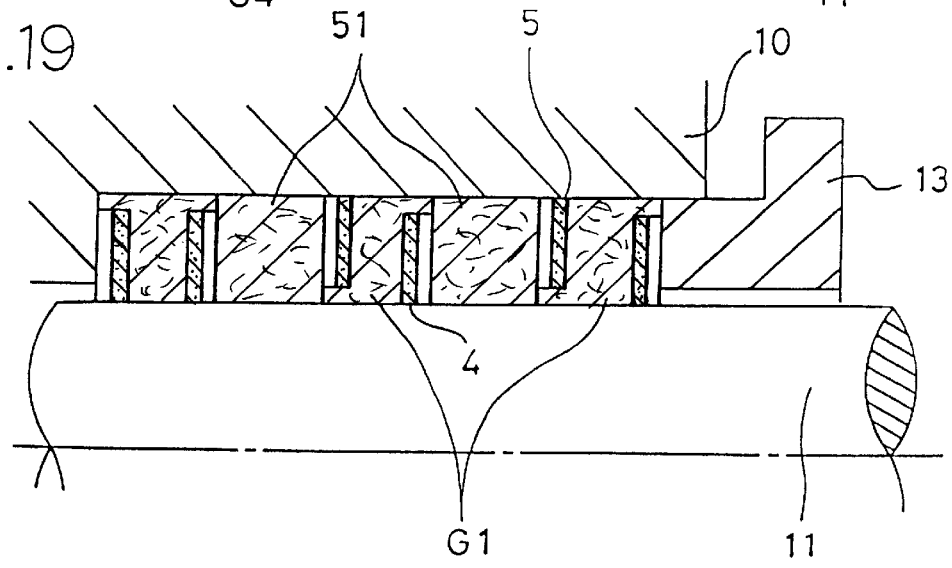
FIG. 19 is a longitudinal section view showing use example 2 of the gland packings of the embodiments of the present invention.
Figure 22:
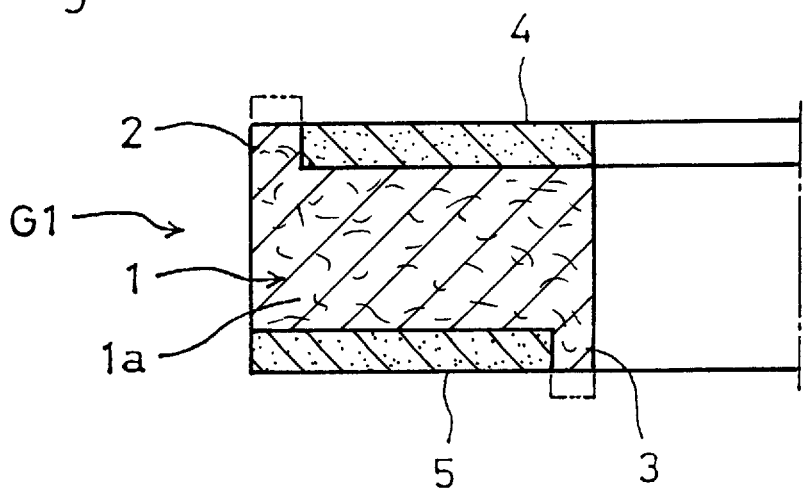
FIG. 22 is an enlarged half longitudinal section view illustrating the deformation action of a projected part in a use state of the gland packing of the first embodiment of the present invention.
Figure 25:
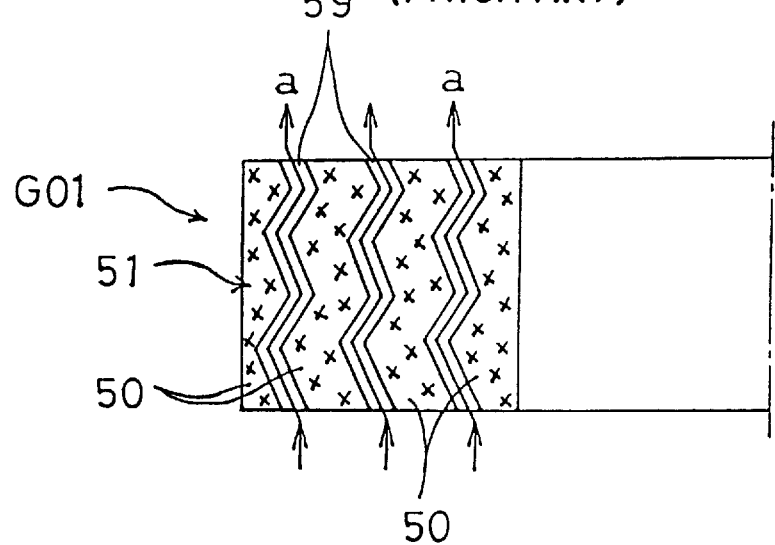
FIG. 25 is a half longitudinal section view showing an example of a prior art gland packing.
Figure 28:
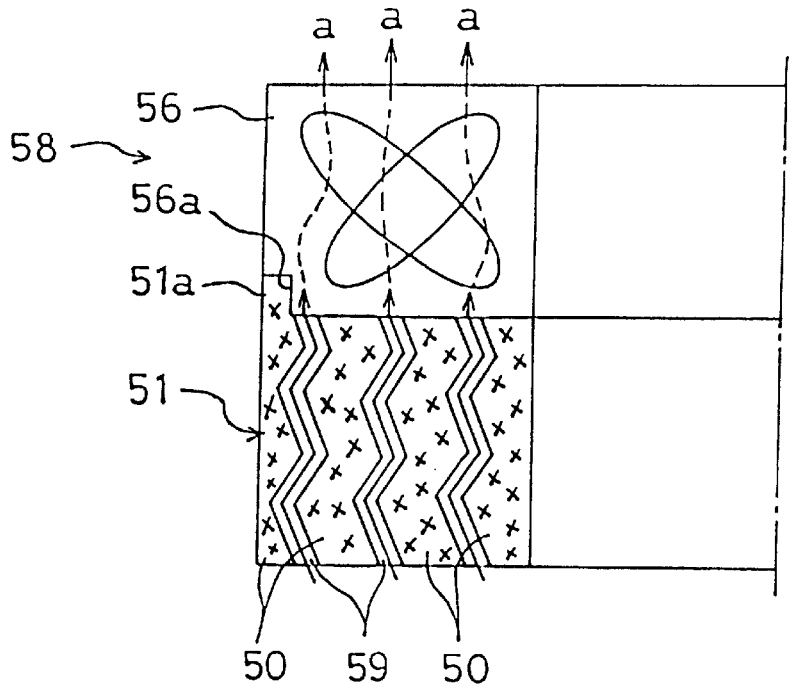
FIG. 28 is a half longitudinal section view showing another example of a prior art gland packing.

FIG. 19 shows a use in which a plurality of gland packings G1 of the first embodiment and gland packings 51 of the prior art shown in FIG. 25 are alternately arranged in an axial direction on the outer peripheral face of a valve rod 11 or the like in a stuffing box 10, and a tightening force is applied to one end in the axial direction through a packing gland 13, thereby forming a shaft seal part. In this use, even when a pressurized fluid penetrates into the minute gaps 59 such as shown in FIG. 25 formed in laminated parts of the tape-like material 50 constituting the die mold packing part 51, the leakage of the penetrating fluid to the outside is blocked by the ring-like seal members 4 and 5 of the gland packing G1 and also stress relaxation due to swelling out in the axial direction of the die mold packing part 1 is suppressed by the ring-like seal members 4 and 5. The circumferentially projected parts 2 and 3 which are projected outwardly in the axial direction from the die mold packing part 1 are easily deformed as shown in FIG. 22 by applying a low tightening force in the axial direction, and hence the density of the projected part is increased and a large stress is generated in a radial direction so that the packing is strongly brought into tight contact with the inner face of the stuffing box 10 and the outer peripheral face of the valve rod 11 or the like. In the same manner as use 1 described above, this surely prevents also the leakage through the projected parts 2 and 3 from occurring, and enhances sealing properties between the stuffing box 10 and the valve rod 11 or the like. Furthermore, the circumferentially projected parts 2 and 3 have a closely packed folded structure and are very elastic, and hence can satisfactorily follow a small amount of wear, thereby ensuring penetration leak prevention and high sealing properties.

Example use 3

Figure 20:
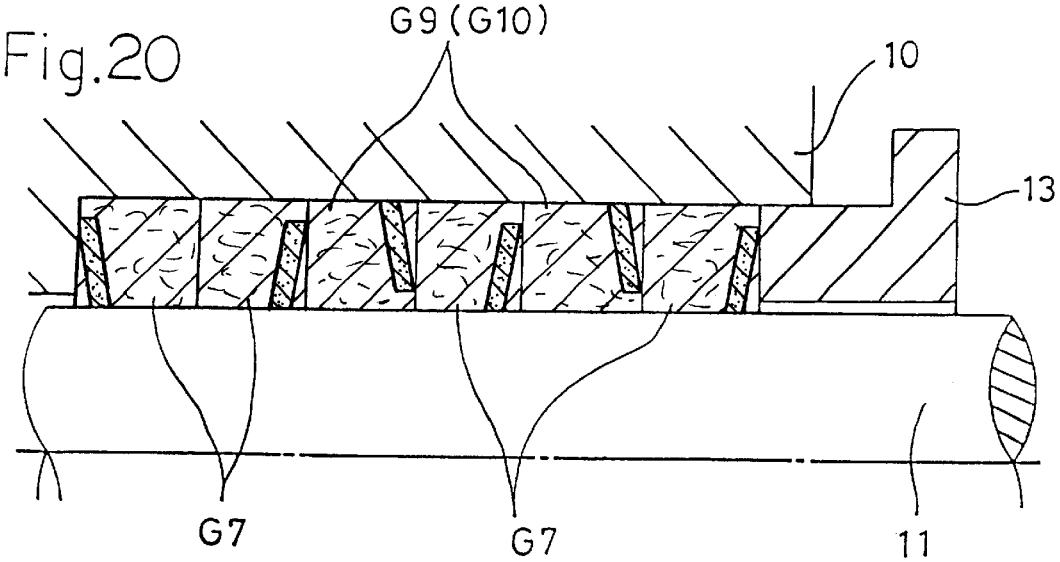
FIG. 20 is a longitudinal section view showing use examples 3 to 5 of the gland packings of the embodiments of the present invention.

FIG. 20 shows a use in which a plurality of gland packings G7 of embodiment 7 and gland packings G9 or G10 of embodiment 9 or 10 are alternately arranged in an axial direction on the outer peripheral face of a valve rod 11 or the like in a stuffing box 10, and a tightening force is applied to one end in the axial direction through a packing gland 13, thereby forming a shaft seal part. In this use, in the same manner as the use examples described above, the ring-like seal member 8 blocks the leakage of the fluid penetrating into the minute gaps 14 to the outside, and suppresses stress relaxation due to swelling out in the axial direction of the die mold packing part 1. Furthermore, the circumferentially projected parts 6A and 6B and the ring-like seal member 8 are easily deformed by applying a low tightening force in the axial direction so as to be positioned in a plane substantially perpendicular to the axis of the valve rod 11 or the like, and hence the density of the projected parts 6A and 6B is increased and a large stress is generated in a radial direction so that the projected parts are strongly brought into tight contact with the inner face of the stuffing box 10 and the outer peripheral face of the valve rod 11 or the like. This can surely prevent penetration leakage through the projected parts 6A and 6B from occurring, and maintain sealing properties between the stuffing box 10 and the valve rod 11 or the like at a high level.

Example use 4

In place of the gland packings G7 and G9 or G10 used in example use 3 shown in FIG. 20, the gland packing G12 of embodiment 12 and the gland packing G14 of embodiment 14 are similarly used so as to form a shaft seal part. Also in this use, in the same manner as that described in example use 3, penetration leak prevention and high sealing properties between the stuffing box 10 and the valve rod 11 or the like can be maintained.

Example use 5

In place of the gland packings G7 and G9 or G10 used in example use 3 shown in FIG. 20, the gland packing G16 of embodiment 16 and the gland packing G18 of embodiment 18 are similarly used so as to form a shaft seal part. Also in this use, in the same manner as that described in example uses 3 and 4, penetration leak prevention and high sealing properties between the stuffing box 10 and the valve rod 11 or the like can be maintained.

Figure 30:
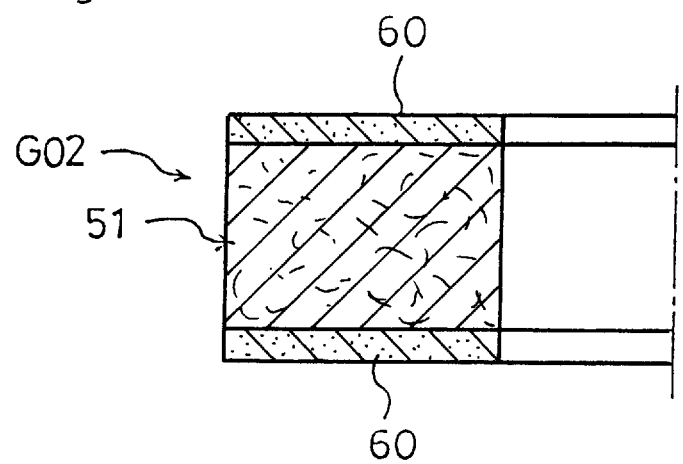
FIG. 30 is a half longitudinal section view showing an example of a gland packing which is a comparison example.
Figure 31:
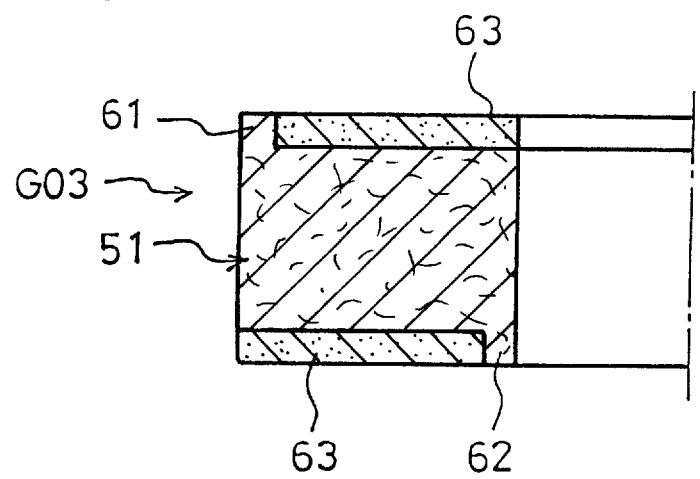
FIG. 31 is a half longitudinal section view showing another example of a gland packing which is a comparison example.

FIG. 23 is a table showing stress generating states in the case where the gland packing G1 of the first embodiment and the gland packing G6 of the sixth embodiment are used as the gland packing of the present invention, a gland packing G01 consisting only of the die mold packing 51 shown in FIG. 25 is used as a prior art packing, gland packings G02 and G03 are used as comparison packings, the gland packing G02 being formed by bringing ring-like seal members 60 into tight contact with the whole area of both end faces in the axial direction of the die mold packing 51 as shown in FIG. 30, the gland packing G03 being formed by integrally projecting circumferentially projected parts 61 and 62 from both end faces in the axial direction of the die mold packing 51 and in the outer and inner end portions in a radial direction, and bringing ring-like seal members 63 of a thickness corresponding to the same height as that of the projected parts 61 and 62 into tight contact with both end faces in the axial direction of the die mold packing 51 excluding the projected parts 61 and 62, and a constant compression force f is applied in the axial direction to the gland packings. In this figure, the length of each arrow corresponds to the magnitude of the stress.

As seen from FIG. 23, according to the gland packings G1 and G6 of the first and sixth embodiments of the present invention, the stresses of the portions corresponding to the circumferentially projected parts 2 and 3, and 6 and 7 are much greater than those in the prior art packing and the comparison packings, the performance of preventing a fluid from leaking through the circumferentially projected parts 2 and 3, and 6 and 7 is excellent, and the tight adhesion force against the stuffing box and the outer peripheral face of a valve rod or the like is large so as to exhibit excellent sealing properties.

Figure 29:
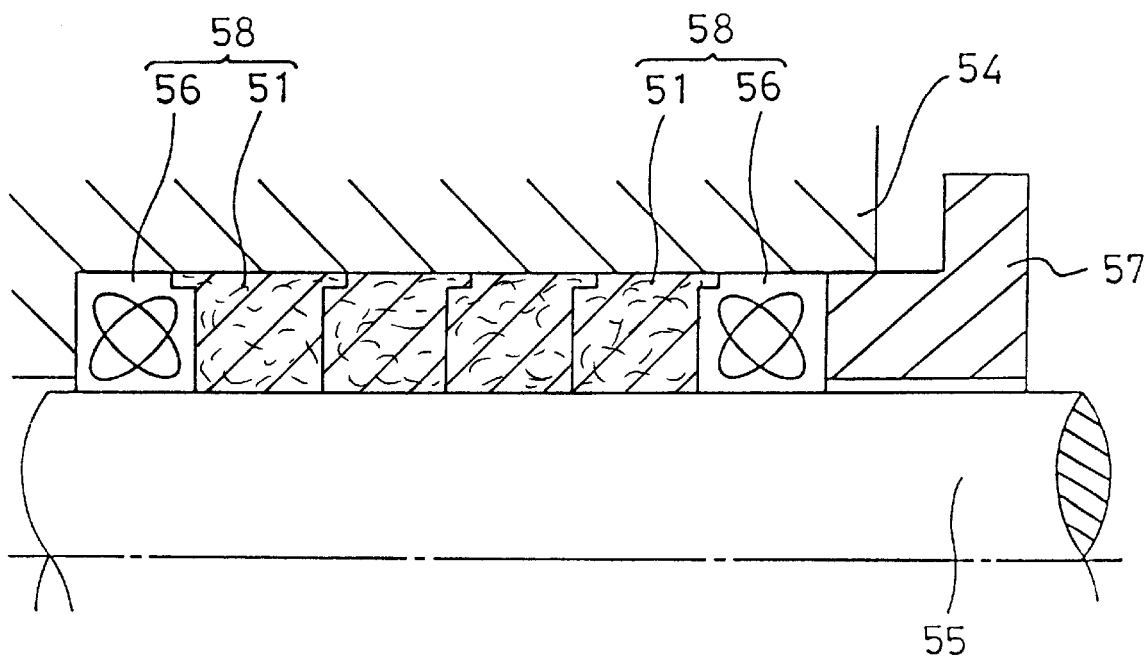
FIG. 29 is a longitudinal section view showing a use example of the gland packing of FIG. 28.

FIG. 24 is a table showing the results of gas-seal tests which were conducted on example uses 1 to 5 of the gland packing of the present invention, and the example uses of prior art packings shown in FIGS. 27 and 29 under the conditions that nitrogen gas $N_2$ was filled at 21 Kgf/cm$^2$ at ordinary temperature.

As seen from this figure, according to the gland packing of the present invention, the leakage amount is very small even in the case where the tightening face pressure is low, thereby exhibiting excellent sealing properties. In a region to which a high tightening face pressure is applied, the leakage amount can be improved to a level of 1/10 to 1/100.

According to the present invention, even when a pressurized fluid penetrates into minute gaps formed in laminated parts of an expanded graphite tape constituting the die mold packing part, it is possible to prevent that fluid from leaking, and also to suppress stress relaxation due to swelling out in an axial direction of the die mold packing part. When the gland packing is to be used while being charged in a stuffing box, furthermore, the projected part which is formed on the die mold packing part so as to project outwardly in the axial direction can be easily deformed only by applying a low tightening force in the axial direction, and hence the density of the projected part is increased and a large stress is generated in a radial direction so that the packing is strongly brought into tight contact with the inner face of the stuffing box and the outer peripheral face of a valve rod or the like. This surely prevents penetration leakage through the projected part from occurring, and the sealing properties between the stuffing box and the valve rod can be maintained at a high level. Furthermore, the circumferentially projected part has a closely packed folded structure and is very elastic, and hence the circumferentially projected part can satisfactorily permit a small amount of wear, thereby attaining an effect that the penetration leak prevention an high sealing properties can be maintained for a long term.

According to the present invention, when the gland packing is to be used while being charged in a stuffing box, the circumferentially projected part which is formed on the die mold packing part so as to project outwardly in an axial direction, and the ring-like seal member are easily deformed only by applying a low tightening force in the axial direction, so that the projected part and the seal member are positioned in a plane substantially perpendicular to the axis of the valve rod or the like, and hence the density of the projected part is increased and a large stress is generated in a radial direction so that the projected part and the seal member are strongly brought into tight contact with the inner face of the stuffing box and the outer peripheral face of the valve rod or the like. In the same manner as described above, therefore, the penetration leak prevention and high sealing properties can be maintained for a long term.

According to the present invention, a circumferentially projected part and a ring-like seal member are strongly brought into tight contact with the inner face of a stuffing box and the outer peripheral face of a valve rod or the like, only by applying a low tightening force in an axial direction, whereby the penetration leak prevention and high sealing properties can be ensured maintained for a long term.

We claim:

1. A gland packing, comprising: a die mold packing part configured as a wound laminated expanded graphite tape, said wound laminated expanded graphite tape defining a pair of parallel end faces; and at least one ring-like seal member engaging one of said end faces, wherein a circumferential projected part projects outward in an axial direction from at least one of said end faces said ring-like seal member having an outer face and being brought into tight contact with said one end face in the axial direction of said die mold packing part excluding said circumferential projected part, and said circumferential projected part projects in the axial direction beyond said outer face of said ring-like seal member.

2. A gland packing according to claim 1, wherein two circumferential projected parts are provided which project outwardly from a respective one of both end faces in the axial direction of said die mold packing part, and two ring-like seal members are provided, which are respectively brought into tight contact with said end faces in the axial direction of said die mold packing part excluding said circumferential projected parts.

3. A gland packing according to claim 1, wherein two circumferential projected parts are provided which project outwardly from a respective one of both end faces in the axial direction of said die mold packing part, with one circumferential projected part extending from an inner end portion of said die mold packing part in a radial direction relative to the other circumferential projected part, and two ring-like seal members are provided, which are respectively brought into tight contact with said end faces in the axial direction of said die mold packing part excluding said circumferential projected parts.

4. A gland packing according to claim 1, wherein said ring-like seal member is selected from a lamination of a sheet material having impermeability, a single plate, and metal foil.

5. A gland packing according to claim 2, wherein said ring-like seal member are selected from a lamination of a sheet material having impermeability, a single plate, and metal foil.

6. A gland packing according to claim 3, wherein said ring-like seal member are selected from a lamination of a sheet material having impermeability, a single plate, and metal foil.

* * * * *

UNITED STATES PATENT AND TRADEMARK OFFICE
CERTIFICATE OF CORRECTION

PATENT NO. : 5,803,464
DATED : September 8, 1998
INVENTOR(S) : Takahisa Ueda et al It is certified that error appears in the above-indentified patent and that said Letters Patent is hereby corrected as shown below:

Claim 1, column 15, line 25, a "," should be inserted between "faces" and "said".

Claim 5, column 16, line 24, "member" should be "members".

Claim 6, column 16, line 28, "member" should be "members".

Signed and Sealed this

Thirtieth Day of November, 1999

Attest:

Attesting Officer

Q. TODD DICKINSON

Acting Commissioner of Patents and Trademarks